April 20, 1937. A. J. GREEN ET AL 2,077,559
POWER OPERATED MEAT SAWING AND CUTTING MACHINE
Filed June 17, 1935 3 Sheets-Sheet 1

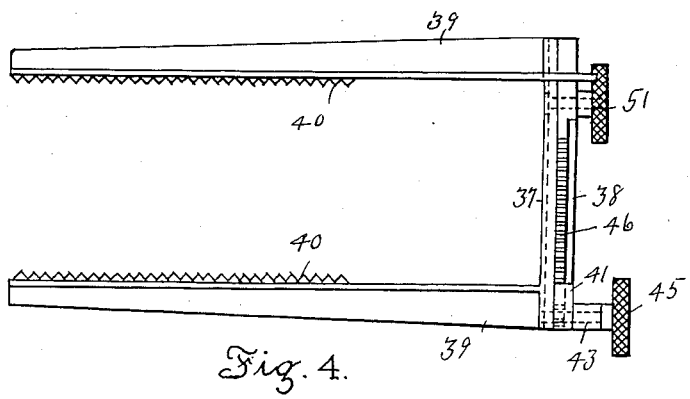
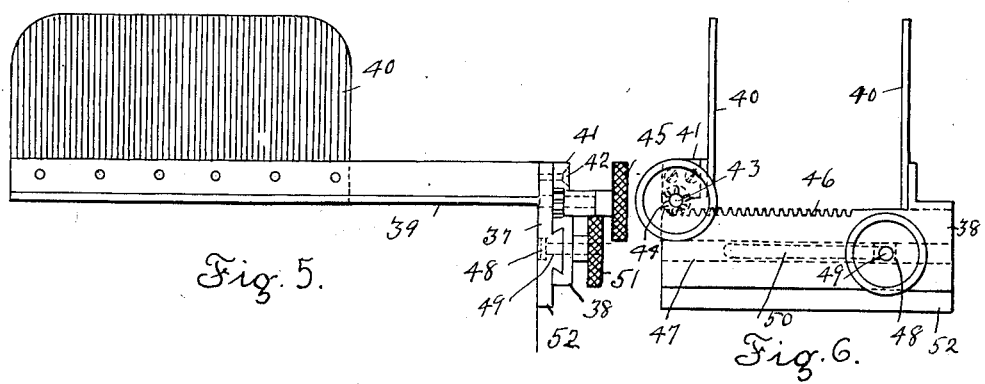
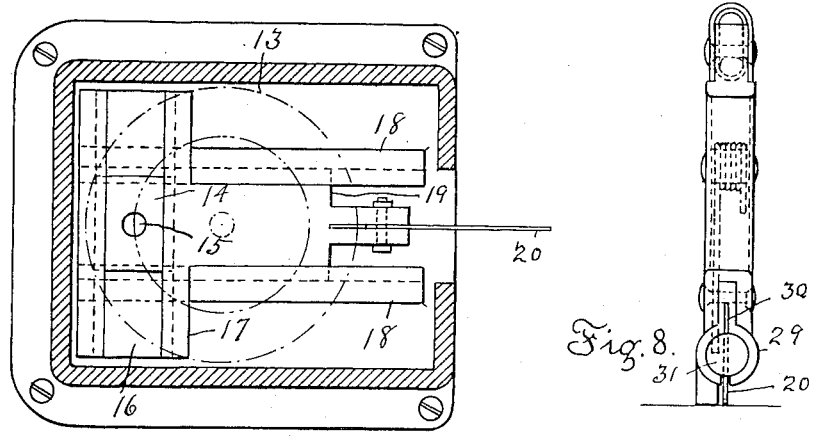

Patented Apr. 20, 1937

2,077,559

UNITED STATES PATENT OFFICE 2,077,559

POWER OPERATED MEAT SAWING AND CUTTING MACHINE

Abraham J. Green and Hiram R. Harding, Baltimore, Md., assignors to The National Equipment Company, a corporation of Maryland Application June 17, 1935, Serial No. 26,965

1 Claim. (Cl. 143—68)

This invention relates to improvements in power operated meat sawing and cutting machines, and has for its object to provide a device of the character described that is simple in construction and easy of operation.

The invention consists of the novel construction and arrangement of the parts and combination of parts hereinafter more fully set forth in the following specification and pointed out in detail in the appended claim.

In the accompanying drawings,—

Figure 4 is a detail plan view of the meat holding device.

Figure 5 is a side elevation of Figure 4.

Figure 6 is a front end elevation of Figure 4.

Figure 7 is an enlarged section on the line 7—7 of Figure 3.

Figure 8 is an enlarged front end view of the saw blade and frame.

Figure 1:
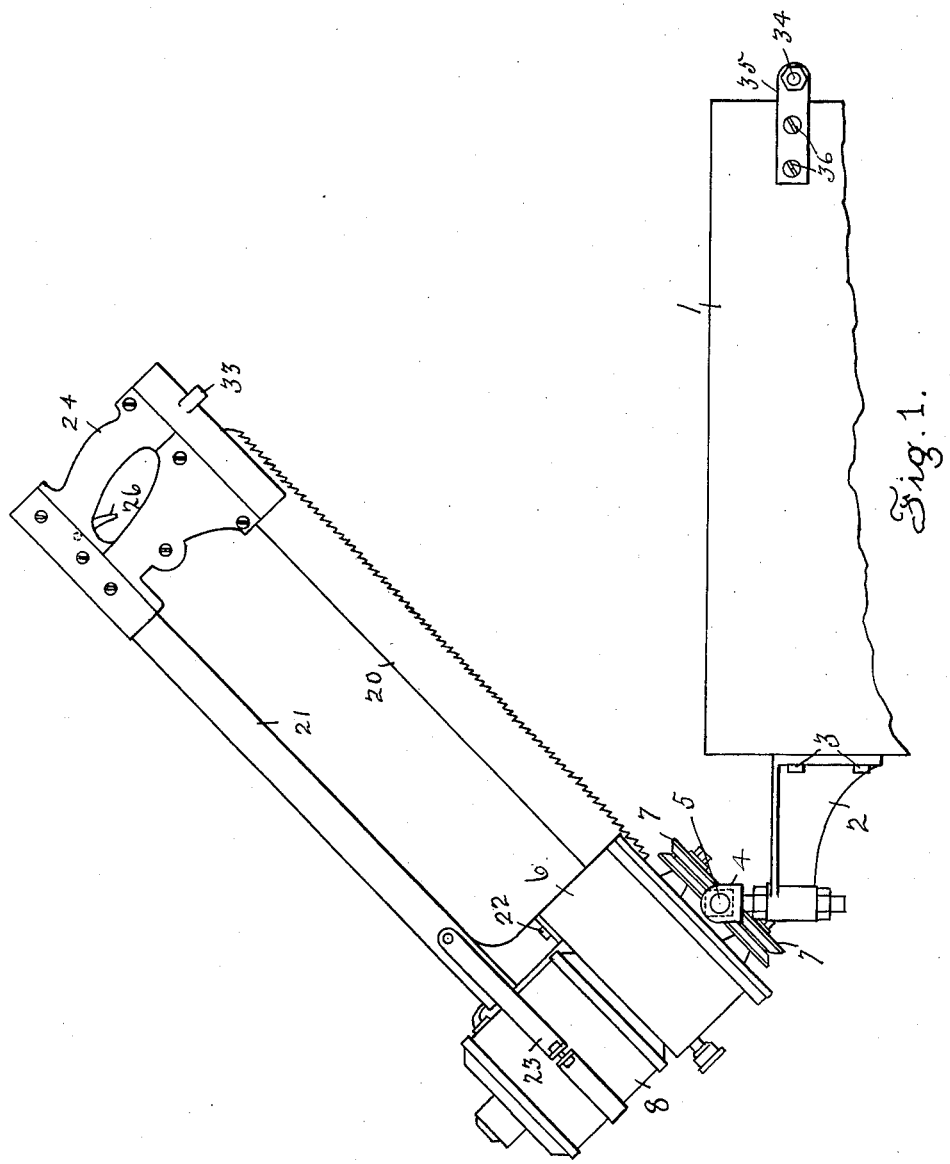
Figure 1 is a side elevation of a butcher's block showing our invention applied thereto, the saw being shown in the raised, or inoperative position, and the meat holding device being omitted.
Figure 2:
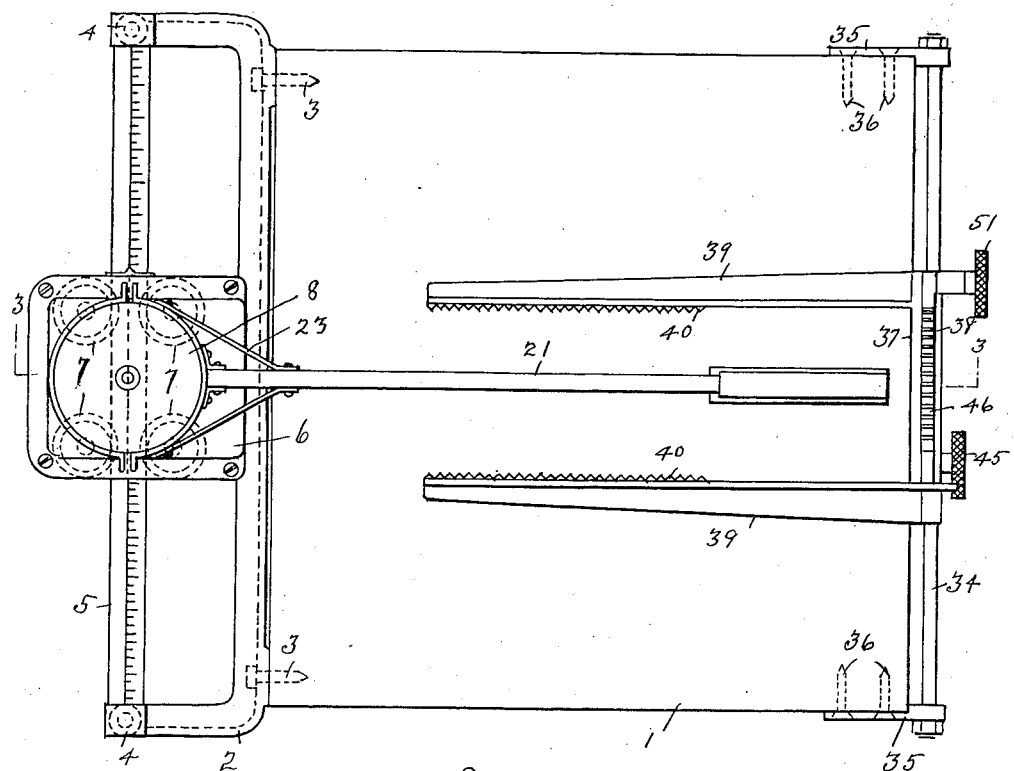
Figure 2 is a plan view of Figure 1 with the meat holding device in position on the block.
Figure 3:
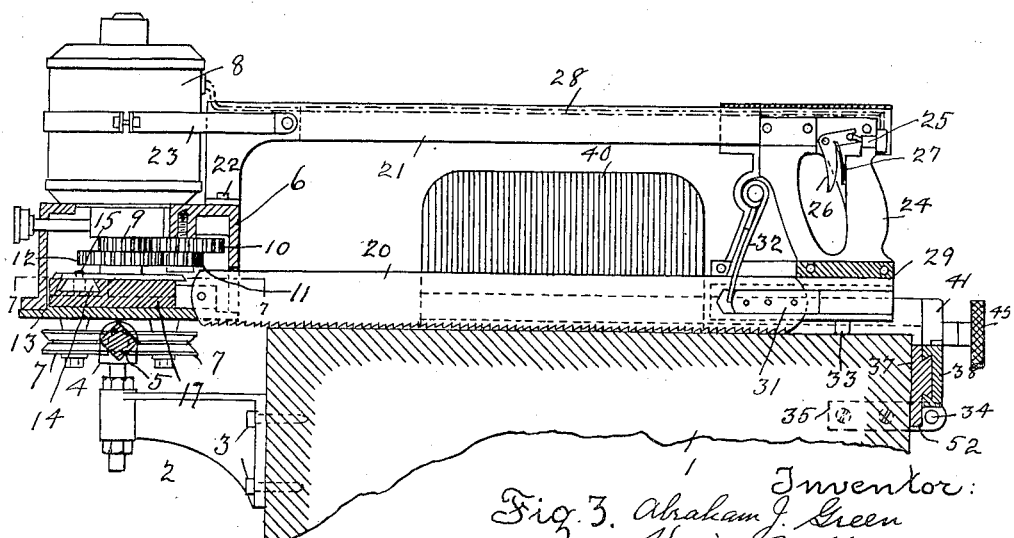
Figure 3 is a section on the line 3—3 of Figure 2.

Referring to the accompanying drawings, forming part of this specification, and in which like reference numerals designate like parts throughout the several views thereof, 1 designates a butcher's block to the rear of which is secured a frame 2 held thereto by the screw bolts 3. In each end of the frame 2 is a bearing 4 in which is mounted a square rod 5 the ends of which latter are rounded to allow the said rod 5 to turn in the bearings 4. Mounted on the rod 5 is a housing 6 having two grooved rollers 7 mounted on its lower surface which permits the angular edges of the rod 5 to project into the grooved rollers and allows the housing to be moved along the said rod 5 in either direction. Mounted on the top of the housing 6 is an electric motor 8 the shaft of which projects into the housing 6 and has a gear wheel 9 on its lower end in mesh with the gear wheel 10 on one side of which latter is a small gear wheel 11 in mesh with the large gear wheel 12 to which latter is secured the disk 13. The aforementioned gear wheels are arranged to reduce the speed from the motor to the disk 13 and consequently impart the proper reciprocal motion to the saw blade which is operated thereby. The disk 13 is connected to the block 14 by the pin 15, said block 14 is dovetailed and slides in a dovetailed groove 16 in the cross head 17 which is mounted in the guides 18. As the disk 13 revolves, the block 14 moves sidewise in the guide 16 of the cross-head 17, and the front end 19 of the cross-head 17 moves back and forth in the guide 18. The saw blade 20 is secured to the front end of the cross-head 17 and is reciprocated back and forth by the disk 13 which moves the cross-head 17 back and forth in the housing 6. The saw frame 21 is secured at its inner end to the housing 6 by the bolts 22 and is also connected to the motor 8 by the strap 23. The outer end of the frame 21 is provided with a handle 24 in which is mounted a switch 25 operated by the spring retained trigger 26 which is held normally in the off position by the spring 27. The switch 25 is connected by wires 28 to the electric motor 8. Secured to the lower end of the handle 24 is a cylinder 29 having a slot 30 therein into which the saw blade 20 projects. The outer end of the saw blade 20 is secured to a round piece 31 which slides in the cylinder 29. A spring 32 has one end secured to the handle 24 and its opposite end impinging against the piece 31 to keep the saw blade taut and to prevent any thumping or jawing as the blade is reciprocated. The saw can be raised to the position shown in Figure 1 of the drawings when not in use. When the saw is to be operated it is brought down on the meat which has previously been placed on the block 1 and by pulling against the trigger 26 the switch 25 will be thrown in the on position which starts the motor 8 and causes the saw to be reciprocated and by pulling down on the handle 24 the blade 20 will continue through the meat until the stop 33 strikes the block 1 indicating that the meat has been completely cut. A rod 34 extends across the front of the block 1 a short distance therefrom and is held in position by the bearings 35 which are secured to the side of the block 1 by screws 36. This rod 34 serves as a holder and rest for the meat holding device which is composed of two plates 37 and 38 dovetailed to slide one upon the other and each having an arm 39 and each said arm having a toothed or serrated disk 40 secured to its inner end. The inner plate 37 has a lug 41 secured thereto by the screw 42 and a short shaft 43 mounted in the lug 41 and having a small pinion 44 on the inner end and a thumb screw 45 in its outer end by means of which the said pinion is turned. The pinion 44 meshes with the rack 46 on the top of the outer plate 38 and by turning the disk 45 the plates 37 and 38 will be caused to slide one upon the other to move the arms 39, and consequently the disks 40, for the purpose of holding or releasing the meat. The plate 37 has a slot 47 extending the entire length thereof in which the head 48 of the bolt 49 projects and slides and the shank of the bolt 49 projects through the elongated slot 50 in the plate 37 and allows the plates 37 and 38 to slide one upon the other. On the threaded end of the bolt 49 is a threaded thumb nut 51 to hold the plates 37 and 38 in the adjusted position. The lower flange 52 of the plate 37 fits down between the block 1 and the rod 34 and holds the meat holding device in position on the block 1.

The meat to be cut is placed on the block 1 between the disks 40 and by means of the threaded thumb nut 45 the disks 40 are brought together against the meat and held in this position by tightening the thumb nut 51. The saw blade is then brought down on the meat and the trigger 26 pulled which throws the switch 25 and starts the motor 8 causing the saw blade 20 to be reciprocated and cut through the meat until the stop 33 strikes the block 1 which indicates that the cutting has been completed. The saw is then raised to the position shown in Figure 1 of the drawings. The rod 5 upon which the motor is movably mounted is provided with a scale 52, and a pointer 52 is carried on the side of the housing 6 which co-operates with the said scale to indicate the size of the piece, or slice, of meat to be cut.

Having thus described our invention, what we claim is:

In a machine of the character described, a block, a frame secured to the rear of said block and having a bearing in each end, a square rod pivotally mounted in said bearings and adapted to turn therein, a housing, grooved rollers mounted on the lower surface of said housing into which the opposite angles of the said square rod fit, a motor mounted on said housing and having its shaft projecting into said housing, a saw frame connected at its inner end to the said housing and motor, a disk operated by said shaft, a block within said housing and operated by said disk, a cross-head operated by said block, a saw blade reciprocally mounted in said saw frame, a handle on the end of the saw frame, a switch mounted in said saw blade, wires connecting the switch with the motor, a trigger mounted on said handle for throwing the switch to start or stop the motor, and holding plates adjustably connected to the front of the first named block.

ABRAHAM J. GREEN.
HIRAM R. HARDING.